US 9,553,522 B2

(12) United States Patent
Boe et al.

(10) Patent No.: US 9,553,522 B2
(45) Date of Patent: Jan. 24, 2017

(54) TRANSFERRING ELECTRICAL POWER FOR SUBSEA APPLICATIONS

(71) Applicants: Ove Boe, Tanem (NO); Espen Haugan, Trondheim (NO)

(72) Inventors: Ove Boe, Tanem (NO); Espen Haugan, Trondheim (NO)

(73) Assignee: Siemens Aktiengesellschaft, München (DE)

( * ) Notice: Subject to any disclaimer, the term of this patent is extended or adjusted under 35 U.S.C. 154(b) by 196 days.

(21) Appl. No.: 14/322,502

(22) Filed: Jul. 2, 2014

(65) Prior Publication Data
US 2015/0009735 A1    Jan. 8, 2015

(30) Foreign Application Priority Data
Jul. 3, 2013   (EP) .................................... 13174851

(51) Int. Cl.
*H02M 5/16* (2006.01)
*H02M 5/27* (2006.01)
*H02J 3/22* (2006.01)
*H02J 3/34* (2006.01)
*H02M 5/12* (2006.01)

(52) U.S. Cl.
CPC ............... *H02M 5/16* (2013.01); *H02J 3/22* (2013.01); *H02J 3/34* (2013.01); *H02M 5/27* (2013.01); *H02M 5/12* (2013.01)

(58) Field of Classification Search
CPC ............ H02M 5/04; H02M 5/06; H02M 5/16; H02M 5/22; H02M 5/27; H02M 5/42; H02J 3/02; H02J 3/22; H02J 3/24; H02J 3/34
See application file for complete search history.

(56) References Cited

U.S. PATENT DOCUMENTS

| 2009/0009931 | A1* | 1/2009 | Rocke | E21B 33/0355 361/602 |
| 2013/0033103 | A1* | 2/2013 | McJunkin | H02J 3/22 307/11 |
| 2013/0169044 | A1* | 7/2013 | Stinessen | H02J 3/34 307/18 |
| 2015/0008765 | A1* | 1/2015 | Boe | H02J 3/00 307/116 |
| 2015/0008766 | A1* | 1/2015 | Boe | H02J 3/1821 307/147 |

FOREIGN PATENT DOCUMENTS

| EP | 2623838 | 8/2013 | |
| WO | 0126201 | 4/2001 | |
| WO | WO 2009015670 A1 * | 2/2009 | ............... H02J 3/34 |
| WO | 2013039403 | 3/2013 | |

OTHER PUBLICATIONS

European Search Report in corresponding European Patent Application No. EP 13 17 4851, dated Nov. 25, 2013, 5 pages.

* cited by examiner

*Primary Examiner* — Fred E Finch, III
(74) *Attorney, Agent, or Firm* — Lempia Summerfield Katz LLC

(57) ABSTRACT

A method for transferring electrical power in the sea includes generating AC power, guiding, at least partially underwater, the AC power through a cable from a first end of the cable to a second end of the cable, and changing a frequency of the AC power guided through the cable based on a value of power consumption of a load connected to the second end of the cable.

22 Claims, 8 Drawing Sheets

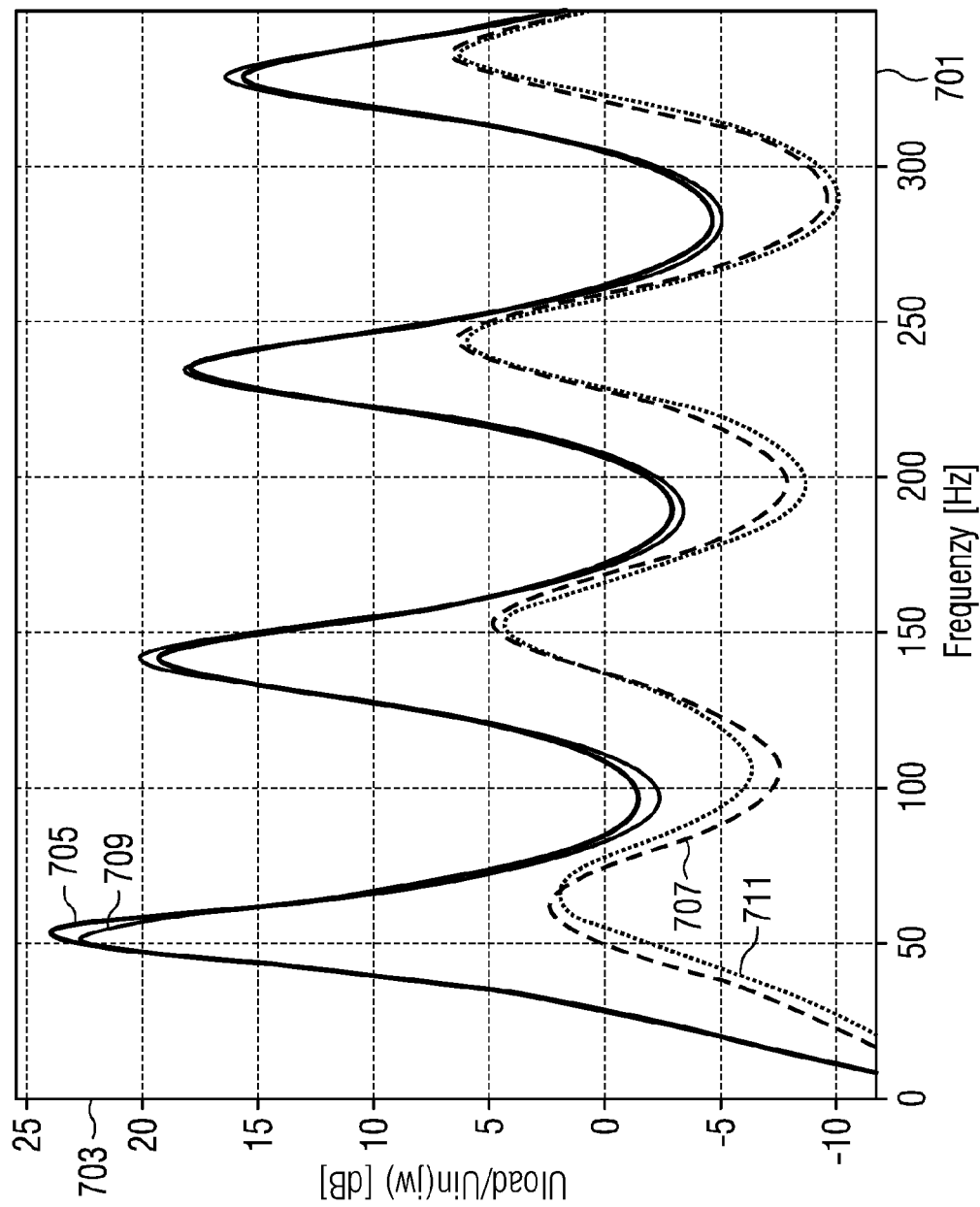

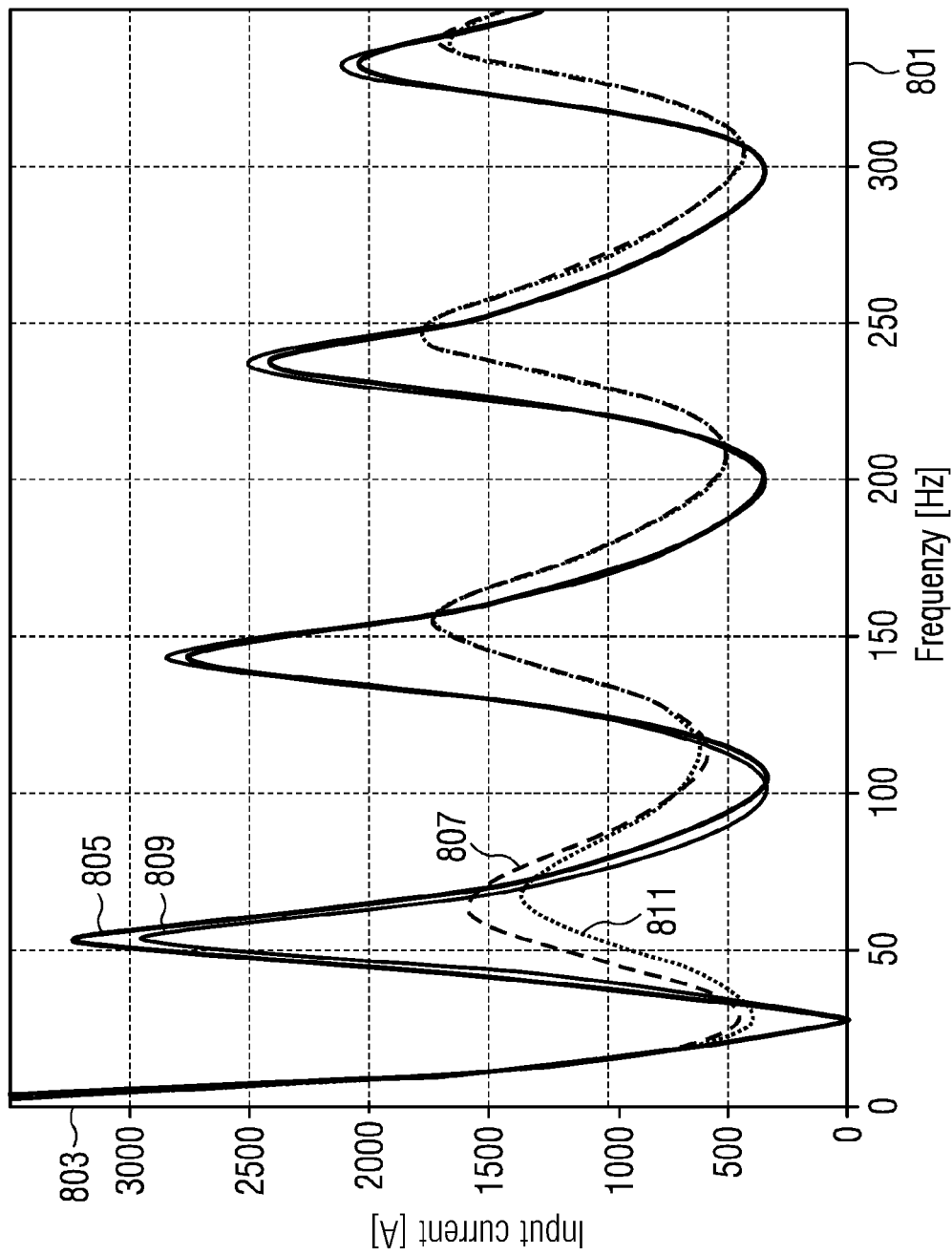

TRANSFERRING ELECTRICAL POWER FOR SUBSEA APPLICATIONS

This application claims the benefit of EP 13174851.9, filed on Jul. 3, 2013, which is hereby incorporated by reference in its entirety.

FIELD OF INVENTION

The present embodiments relate to a method and to an arrangement for transferring electrical power in the sea, e.g., to a subsea grid, e.g., in order to provide electrical power at a subsea exploration site.

BACKGROUND

Conventional electrical AC power cable transmission may be limited in distance due to cable properties. Typical maximum AC transmission distance at 50/60 Hz may be between 100 km and 200 km. If longer distances are needed, DC transmission is used. For subsea power, it is useful to reach out farther than 200 km. For arctic areas, hydro carbon reservoirs with step outs up to 600 km from shore are explored. AC power may be used for powering consumers at a subsea exploration site, such as pumps, compressors, motors etc. Therefore, in a conventional system, the DC power transmitted to the sea ground is converted into AC power, in order to be appropriate to power the consumers at the subsea exploration site. However, converting the DC power to an AC power involves large and heavy equipment that poses a number of problems for setting up the exploration site and also increases the costs of the system. When designing a subsea power grid, reliability may be one of the main factors. To increase the reliability of a subsea power grid, it may be useful to limit the complexity and also to limit components with low reliability, such as non-redundant types of components. Only medium voltage distribution technology for AC solution may be reliable. This means that DC power is converted to AC power subsea for subsea DC transmission systems. The DC to AC converting system may be a complex system consisting of a high number of components, and may reduce reliability relative to a subsea AC transmission system.

There may be a need for a method and an arrangement for transferring electrical power in the sea, which facilitates powering of electrical AC power of subsea consumers with step out much longer than today's typical maximum transmission distance of 100-200 km. Benefits may also be provided if this increases the reliability and at the same time reduces the size of the equipment. Further, there may be a need to provide AC consumers with AC power in a simpler manner involving smaller or lighter equipment than a conventional system.

SUMMARY AND DESCRIPTION

The scope of the present invention is defined solely by the appended claims and is not affected to any degree by the statements within this summary.

The present embodiments may obviate one or more of the drawbacks or limitations in the related art.

According to an embodiment, a method for transferring electrical power in the sea (e.g., to a subsea grid) includes generating AC power, guiding, at least partially underwater, the AC power through a cable from a first end of the cable to a second end of the cable, and changing a frequency of the AC power guided through the cable based on a value of power consumption of a load connected to the second end of the cable.

A converter (e.g., included in a power supply), e.g., a topside converter located above the sea level, may be adapted to change the frequency or to select the appropriate frequency. Further, the converter may be adapted to (e.g., concurrently with the changing of the frequency) vary the topside voltage (e.g., the output voltage of a power supply located above the sea level) as a function of a resistance of the load or a power consumption of the load. Further, the converter or the power supply may react, in case of a trip of a load, very fast by tripping or by actively regulating down the voltage of the power supply, to damp out transients.

Changing the frequency may avoid resonances of voltage or current within the cable. The reliability of transfer of the electrical power may thereby be improved.

According to an embodiment, the method further includes changing the frequency from a previous frequency at a previous value of power consumption to a changed frequency at a changed value of power consumption. The previous frequency is selected based on a length of the cable between the first end and the second end of the cable, e.g., to avoid resonances.

The previous value of the power consumption may be substantially zero or may be a value corresponding to an average power consumption of the load expected for the application. For the previous value of the power consumption, a previous frequency may be selected or adjusted to avoid resonances within the cable. However, when the power consumption changes to the changed value of the power consumption, resonances may occur at frequencies other than the resonance frequencies for the situation when the previous value of power consumption prevailed. Thus, the previous frequency is changed to the changed frequency, which may avoid the resonances that occur in the situation of the previous frequency when the changed value of the power consumption is present. Resonances may be avoided when a load connected to the second end of the cable requires or has different power consumption or changing power consumption. Transferring the electric power may be improved.

According to an embodiment, the previous value is smaller than the changed value, and the previous frequency is greater than the changed frequency. According to another embodiment, the previous frequency may be smaller than the changed frequency. The changed frequency may be selected to lie between resonance peaks that are calculated in the situation when the load draws the changed value of power consumption through the cable.

According to an embodiment, the method further includes, along with changing the frequency, changing a first voltage based on the power consumption of the load connected to the second end of the cable. The first voltage represents a voltage of the generated AC power or a voltage at the first end of the cable.

When the power consumption of the load increases, the first voltage may also be increased concurrently or in a step-wise manner, in order to maintain a second voltage that may be the voltage applied across the load. The voltage at the second end of the cable, e.g., at the subsea's exploration site, may be substantially maintained constant or at least may change less than a threshold.

According to an embodiment, the first voltage is changed from a previous first voltage at the previous value of power consumption to a changed first voltage at the changed value of power consumption. The previous first voltage is smaller than the changed first voltage.

By increasing the previous first voltage to the changed first voltage when the power consumption increases, the second voltage (e.g., the voltage across the load) may substantially be kept constant or may at least change less than a threshold.

According to an embodiment, the changing includes, based on the power consumption of the load, the frequency and/or the first voltage, calculating plural voltage ratios (Uload/Uin) between a second voltage (Uload) and the first voltage (Uin) based on different test frequencies and based on at least the previous value and the changed value of power consumption. The second voltage represents a potential difference between the second end of the cable and a reference potential. The changing further includes selecting the previous frequency and/or previous first voltage for which the respective calculated voltage ratio changes, from a situation of the previous value to the changed value of power consumption, less than a ratio threshold. The method may further include selecting the changed frequency and/or changed first voltage based on the plural calculated voltage ratios.

Calculating the plural voltage ratios may aid selection of the previous frequency, e.g., to avoid resonances. The previous value and the changed value of power consumption may be any values, such as values expected in a typical subsea exploration procedure. For example, the previous value may correspond to an average value (or zero) of power consumption. The changed value of power consumption may correspond to a maximal expected (or average) value of power consumption. Other values are possible. For example, the previous value may correspond to substantially zero power consumption, while the changed value may correspond to an average power consumption or to a maximal power consumption. Furthermore, additional values of power consumption may be considered for which the plural voltage ratios are calculated.

Selection of the proper previous frequency may be simplified. Further, also the changed frequency may be selected based on the calculated plural voltage ratios. The changed frequency and/or changed first voltage may be selected such that the voltage ratio does not change much or less than a threshold when starting from a situation where the load has the previous value of power consumption and switching to the situation where the load has the changed value of power consumption.

According to an embodiment, an absolute value of the ratio threshold is 0.5, 0.4, 0.3, or 0.2.

The lower the absolute value of the ratio threshold is, the more constant the voltage may be kept, when the power consumption of the load changes from the previous value to the changed value.

According to an embodiment, the method further includes calculating plural input currents for plural test frequencies. The input current represents a respective current of the generated AC power supplied to the first end of the cable, for each test frequency considering at least the previous value of power consumption of the load. The previous and/or changed frequency is selected from the plural test frequencies for which the input current is within a range according to a rating of the cable.

By considering also the plural input currents calculated, a selection of the previous and/or changed frequency may still be improved, because the frequency may then also be selected such that the respective input current complies with rating information of the cable. Equipment damage may thus be avoided or reduced.

According to an embodiment, the method further includes, in case of a trip of a load connected to the second end of the cable, regulating down the first voltage in order to damp out transients.

According to an embodiment, for changing a frequency of the AC power, a converter, such as an AC-DC-AC converter, e.g., located above the sea level, is employed. The converter may include a number of controllable switches, such as IGBTs. The IGBTs may be controlled by pulse width modulation signals sent to respective gates of the IGBTs. Conventionally available equipment may thus be utilized for performing the method.

According to an embodiment, a frequency between resonance peaks according to a calculated voltage ratio curve is selected as the previous frequency, e.g., between a first and a second resonance peak, or between a second and a third resonance peak.

Between resonance peaks, the electrical properties, such as voltage ratio and/or input current, may be relatively low, e.g., below thresholds of the voltage and/or current. Reliable and secure operation may thus be enabled.

According to an embodiment, the method further includes transforming a voltage of the AC power to a higher voltage and supplying the transformed voltage to the first end of the cable, and/or transforming the AC power guided through the cable at the second end of the cable and supplying the transformed AC power to a load.

By transforming the voltage to a higher voltage before transferring the AC power through the cable, resistive losses may be reduced. Further, the voltage may be transformed to suitable values that may increase the flexibility of the method.

According to an embodiment, the previous and/or changed frequency of the AC power is between 10 Hz and 300 Hz, e.g., between 50 Hz and 150 Hz, or 50 Hz. The cable may be disposed at least partially underwater. For example, between 80% and 100% of the length of the cable may be underwater. The frequency range may thus be provided by conventionally available equipment.

According to an embodiment, the previous first voltage is predetermined and the second voltage is calculated for a given power consumption of the load. A model of the cable may be utilized. The model may include plural PI-elements. In the model, the second end of the cable is between 1000 m and 4000 m below sea level, the cable has a length between 100 km and 1000 km, e.g., between 200 km and 600 km, and the voltage at the cable is between 80 kV and 100 kV.

For a calculated second voltage, a more accurate simulation may be performed using a model of the cable including a number of PI elements.

Features individually or in any combination disclosed, described, applied or provided for a method for transferring electrical power in the sea may also be applied individually or in any combination to an arrangement for transferring electrical power in the sea according to an embodiment and vice versa.

According to an embodiment, an arrangement is provided for transferring electrical power in the sea. The arrangement includes a power supply for generating AC power, a cable for guiding, at least partially underwater, the AC power through from a first end of the cable to a second end of the cable, and a converter for changing a frequency of the AC power guided through the cable in dependence of a value of power consumption of a load connected to the second end of the cable.

Embodiments have been described with reference to different types of subject matter. Some embodiments have been described with reference to a method whereas other embodiments have been described with reference to an apparatus. However, a person skilled in the art will gather from the above and the following description that, unless other notified, any combination of features of one type of subject matter are considered to be disclosed as combinations of features relating to different subject matters, e.g., between features of a method and features of an apparatus.

The aspects defined above and further aspects of the present embodiments are apparent from the examples to be described hereinafter and are explained with reference to the examples. The disclosed embodiments will be described in more detail hereinafter with reference to examples but to which the invention is not limited.

BRIEF DESCRIPTION OF THE DRAWINGS

FIG. 7 illustrates an example dependency of a voltage ratio as a function of the frequency of AC power when a capacity effect of a cable is compensated for using two or more reactors; and FIG. 8 illustrates an example dependency of an input current as a function of the frequency when a capacity effect of the cable is compensated for using two or more reactors connected to the cable.

DETAILED DESCRIPTION

Figure 1:
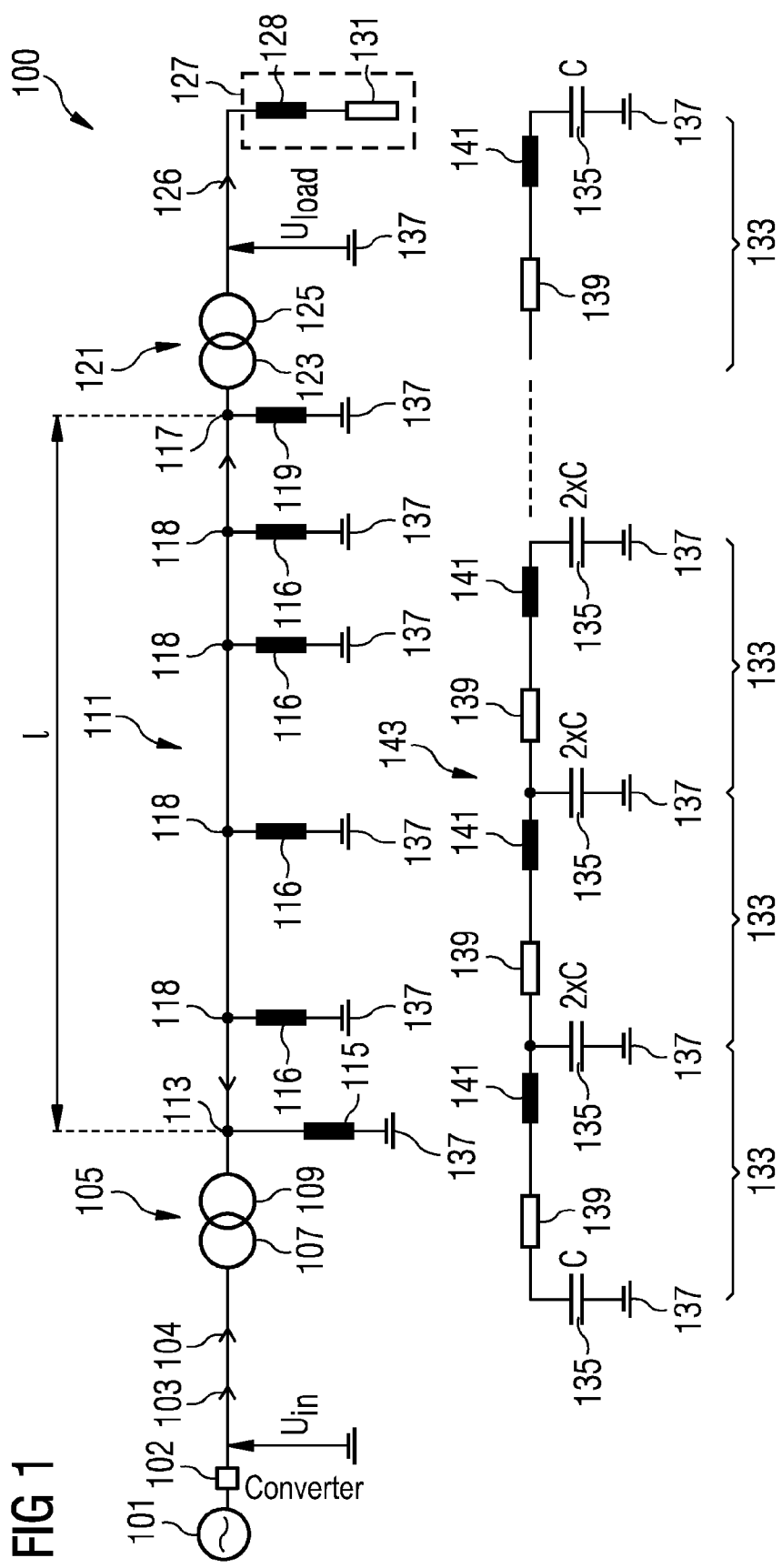
FIG. 1 schematically illustrates an arrangement for transferring electrical power according to an embodiment.

FIG. 1 schematically illustrates an arrangement 100 for transferring electrical power in the sea according to an embodiment. The arrangement performs a method for transferring electrical power in the sea according to an embodiment. The arrangement 100 includes (above the sea level) a power source 101 connected to a converter, which are adapted to generate AC power 103. The AC power 103 is supplied to a topside transformer 105 having a primary coil 107. The primary coil 107 is inductively coupled to a secondary coil 109. The topside transformer 105 transforms a voltage of the AC power 103 to a higher voltage and supplies the transformed voltage to a cable 101. The cable 101 may at least partly be disposed under water, e.g., in the sea. The cable 101 may have a length between 100 km and 1000 km. Further, it may be used to supply the AC power 103 to a subsea exploration site or to supply to a subsea distribution grid.

The AC power 103 is associated with an input current 104. The voltage generated by the power supply 101 or output by the converter 102 is indicated in FIG. 1 with reference sign $U_{in}$, and is also referred to as a first voltage. The topside transformer 105 provides the transformed voltage $U_{in}$ at a first end 113 of the cable 111. At this first end 113, a reactor 115 is connected (to an earth, or ground, potential), to compensate for a capacitor effect of the cable 111. The reactor connected at the first end 113 of the cable 111 may have a suitable inductance or reactance adjusted or selected to compensate for the capacitor effect of the cable 111.

When around 200 km step outs (cable length) are present at 50 Hz, in a conventional system, voltage may change from load condition to no-load condition, due to the parallel capacitor effects in the cable. The stationary effect of the capacitors in the cable may follow according to $1/(j*w*C)$, where j is the imaginary number, w=2*pi*frequency and C is the capacitance. When, according to an embodiment, frequency is reduced or increased from 50 Hz, the effect of the capacitance in the cable may also be reduced stationary.

The AC power 103 is then transferred through the cable 111 to a second end 117 of the cable 111. The second end 117 is located under water, e.g., at a bottom of the sea. At the second end 117 of the cable 111, a second reactor 119 is connected to the earth potential, in order to compensate for the capacitor effect of the cable 111. A subsea transformer 121 is located close to the second end 117 of the cable 101. The subsea transformer 121 has a primary side 123 and a secondary side 125 inductively coupled to the primary side 123. The subsea transformer 121 transforms the voltage at the cable 111, e.g., a voltage between 80 kV and 120 kV, such as around 90 kV, to a desired voltage at the subsea grid, for example to between 30 kV and 50 kV, such as around 36 kV. At the secondary coil 125 of the subsea transformer 121, a load 127 is connected having an inductance 129 and a resistance 131. The load 127 may further include a capacitance (not shown). The load 127 may be a single load, may be a plurality of loads, and/or may represent an entire subsea distribution grid having plural loads. The plural loads may be connectable and disconnectable or switched on and off in any circuit topology.

According to an embodiment, the cable 111, e.g., the electrical properties of the cable 111, is modelled using a series connection of a plurality of PI elements 133. Each PI element 133 has a capacitor 135 connected to the earth potential 137 and a resistor 139 connected to one end of the capacitor 135. Each PI element further has an inductance 141 connected in series with the resistor 139. The PI elements 133 are connected in series as an equivalent circuit 143 for modelling or describing the electrical properties of the cable 111. The equivalent circuit 143 is used according to an embodiment to calculate electrical properties of the arrangement 100, such as a second voltage $U_{load}$ representing the voltage applied to the load 127 when the power supply 101 provides a first voltage $U_{in}$.

The equivalency circuit 143 may be used to calculate the second voltage $U_{load}$ given the first voltage $U_{in}$ for different power consumptions 126 of the load 127. Further, the input current 104 may be calculated using the equivalent circuit diagram or circuit 143 for a given first voltage $U_{in}$ and a given power consumption 126 of the load 127. Based on such calculations, further more detailed simulations may be performed, in order to determine electric properties of the arrangement 100. The frequency of the AC power 103 and/or voltage $U_{in}$ of the AC power 103 may be selected or adjusted based on the electric properties. The frequency and/or voltage may be selected or adjusted as a function of a length l of the cable 111 and as a function of the power consumption 126 (e.g., including active power consumption and/or reactive power consumption) of the load 127. According to an embodiment, the reactors 115, 119 may be missing in the arrangement 100 illustrated in FIG. 1 or may be switched off or disconnected.

According to an embodiment, the power supply 101 is adapted to adjust a frequency of the AC power 103 as a function of the length l of the cable 111 between the first end 113 and the second end 117 of the cable.

In other embodiments, additionally or alternatively, at least two reactors 115 and 119 may be connected to the cable. One of the reactors may be connected to the first end (or close to the first end) 113 of the cable 111 and another reactor 119 may be connected close to the second end 117 of the cable 111. According to still further embodiments, further reactors 116 may be connected along the cable 111 at plural locations 118, which may be spaced apart from each other. The locations 118 may be evenly spaced apart from each other. The arrangement 100 may exclusively or additionally be configured in a way such that inductances of the reactors 115, 119 (and, for instance, also of the further reactors 116) are selected, in order to at least substantially compensate for reactive power generated in the cable 111. The values of the inductances of the reactors 115, 116, 119 may depend on the properties of the cable 111 and/or the frequency/voltage of the power supply and possibly on further parameters, such as voltage and cable length. The cable 1/(w*C) may be the same as the total compensation of the parallel inductances w*L. In this case w*L may cancel out the cable 1/(w*C).

According to an embodiment, the power supply 101 includes a converter for changing the frequency of the AC power 103 guided through the cable 111 as a function of a value of the power consumption 126 of the load 127 which is connected to the second end (e.g., via the subsea transformer 121) of the cable 111.

A cable electrically described with resistance R [Ohm/m], inductance L [H/m] and capacitance C [F/m] may have cable resonances as a function of the cable travelling time. The wave velocity, v, of the cable, may be given by: v=1/sqrt (LC).

The travelling time τ of the cable is given by τ=d/v.

The length of the cable, e.g., the cable 111, is illustrated in FIG. 1 as d (also referred to as l).

Resonances in the cable 111 may be found at the following travelling times (or frequencies): 1/4τ, 3/4τ, 5/4τ . . . .

Further, damping frequencies may be found at: 2/4τ, 4/4τ, 6/4τ . . . .

Figure 2:
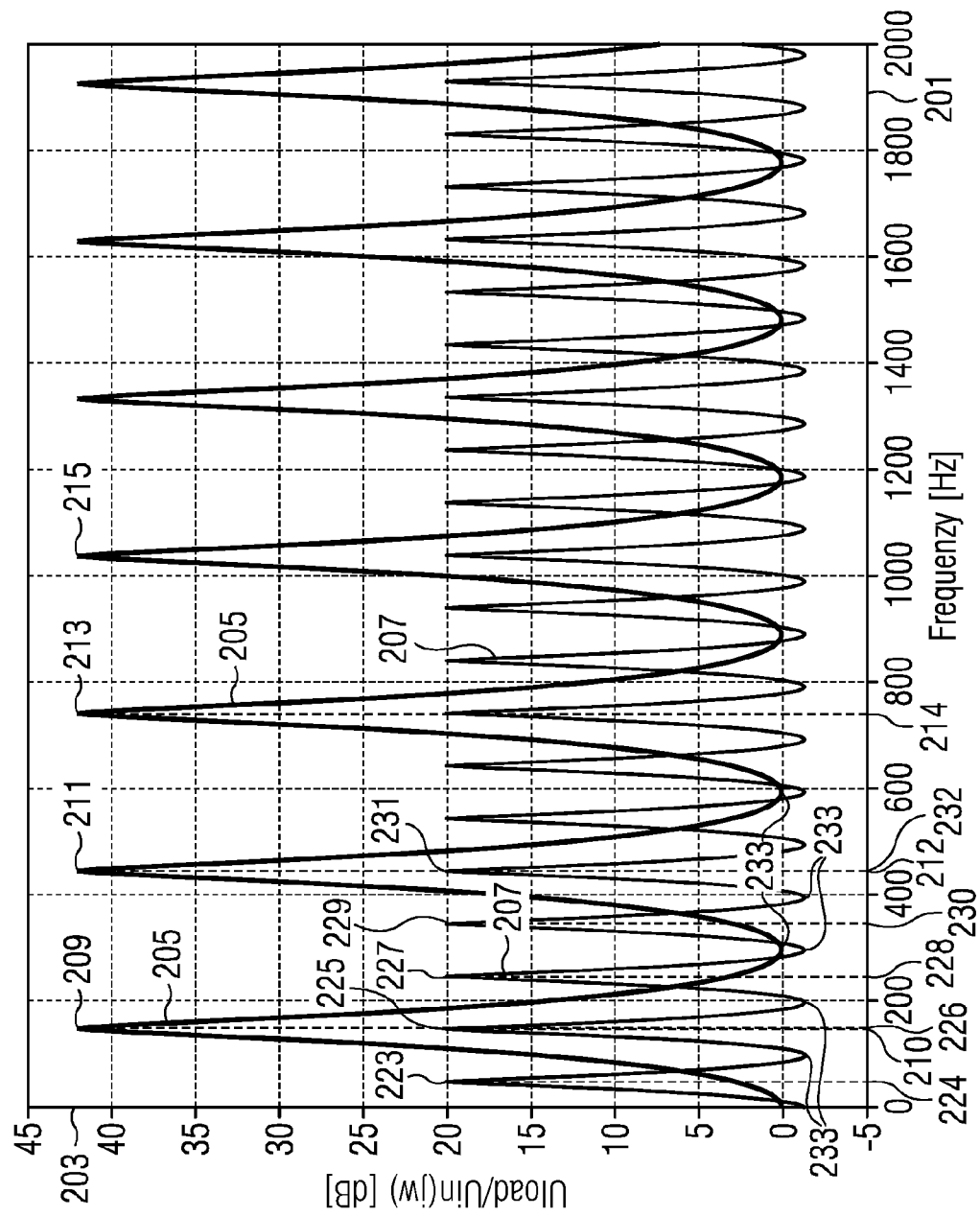
FIG. 2 illustrates a graph depicting a dependency of a voltage ratio observed in an arrangement of FIG. 1 as a function of the frequency of the AC power.

FIG. 2 illustrates a so-called cable frequency plot illustrating a dependency of a voltage ratio (ordinate 203) as a function of a frequency (abscissa 201). The voltage ratio is the ratio between the second voltage $U_{load}$ (see FIG. 1) and the first voltage $U_{in}$ (see FIG. 1). In particular, the curve 205 illustrates the situation of a length l of the cable of 200 km. The curve 207 illustrates the situation when the length l of the cable 111 is 600 km. The curves 205, 207 represent calculated or simulated curves, when the cable 101 is described or modelled with 500 PI elements and the following electrical data (e.g. data, from a 123 kV, 300 mm² cable):

Rc=0.0601 [Ohms/km]
Cc=0.17 e-6 [F/km]
Xc50=0.13 [Ohm/km]
Lc=4.1380 e-4 [H/km]

The curve 205 has resonance peaks 209 (first resonance peak), 211 (second resonance peak), 213 (third resonance peak), 215 (fourth resonance peak) and so on. In between the resonance peaks 209, 211, 213, 215, valleys of low values 221 are present. The valleys may correspond to the damping frequencies explained or defined above.

Further, the curve 207 includes a first resonance 223, a second resonance 225, a third resonance 227, a fourth resonance 229, a fifth resonance 231 and so forth. Also between these resonances 223, 225, 227, 229 and 231, valleys 233 are present.

The frequencies at which the resonance peaks occur for the cables of different lengths are at different resonance frequencies. The resonance 209 occurs at a frequency 210, the resonance 211 occurs at a frequency 212, the resonance 213 occurs at a frequency 214. In contrast, the frequency of the cable of length 600 km for the resonance 223 occurs at the frequency 224, the resonance 225 occurs at a frequency 226, the resonance 227 occurs at a frequency 228, the resonance 229 occurs at a frequency 230 and the resonance 231 occurs at a frequency 232 and so forth. The frequencies 210, 212, 214 are different from the frequencies 224, 226, 228, 230, 232 and so forth. This observation is exploited according to embodiments to enable a reliable transfer of electrical power 103 from a topside facility to a subsea exploration site.

Based on the relationship τ=d/v, the resonance or resonances 209, 211, 213, 215 should be at: 149.0, 447.1, 745.2, 1043.2, 1341.3 Hz for the cable of length 200 km and should be 49.7, 149.0, 248.4, 347.7, 447.1 Hz for a cable of length 600 km.

According to an embodiment, an input current 104 is also calculated as a function of the frequency for the situations of cable lengths considered in FIG. 2.

Figure 3:
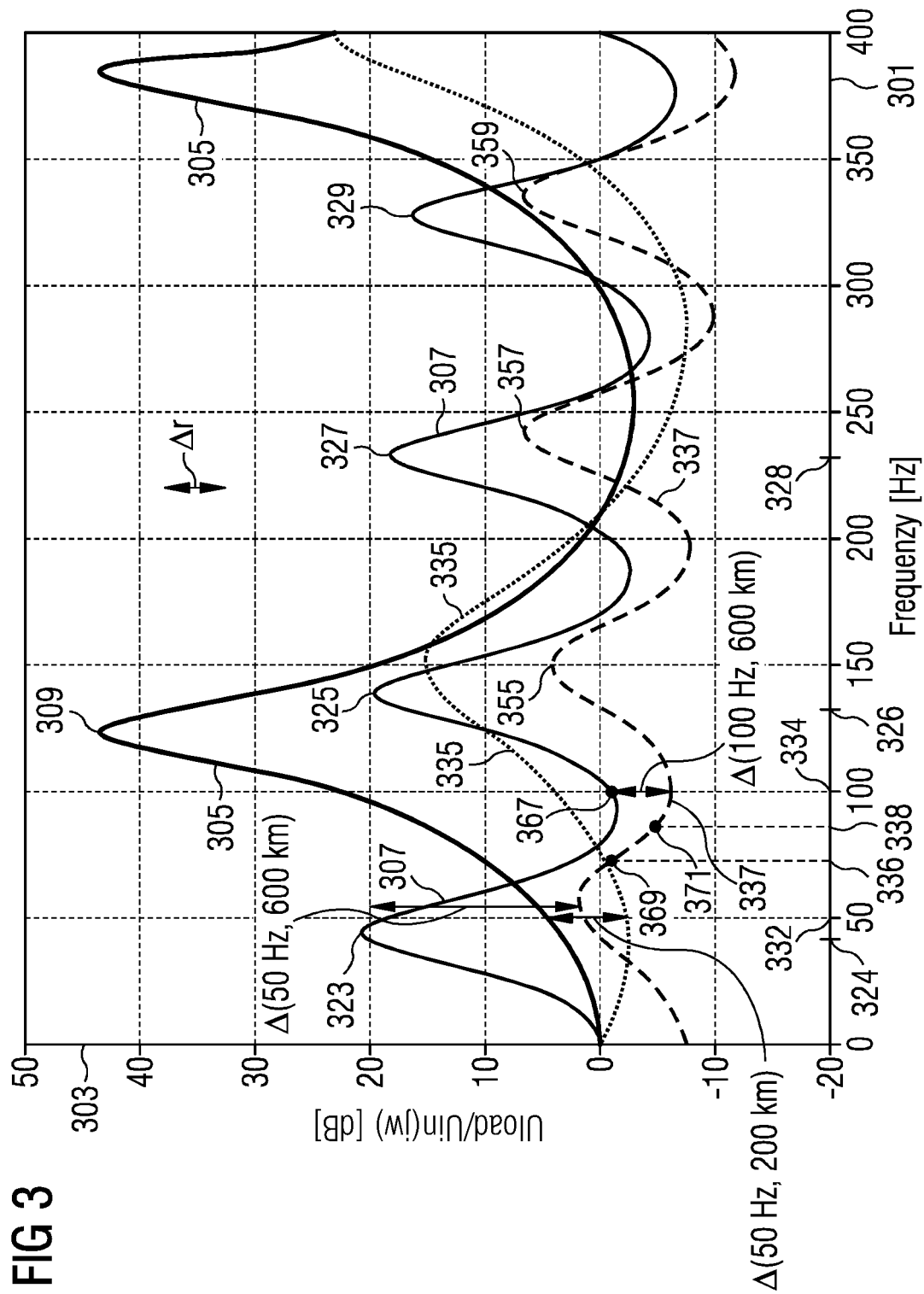
FIG. 3 illustrates a portion of the graph of FIG. 2 illustrating a method for transferring electrical power according to an embodiment performed by the arrangement of FIG. 1 according to an embodiment.

FIG. 3 illustrates a portion of the curves 205, 207 illustrated in FIG. 2 as the curves 305 and 307 for the situation when the power consumption 126 of the load 127 is substantially 0, e.g., such that substantially no load 127 is connected to the second end 117 of the cable 111, as illustrated in FIG. 1.

In addition to this situation where no load is connected to the cable 101, FIG. 3 illustrates curves 335, 337 corresponding to the situation when a load of 80 MW is connected to the second end 117 of the cable 111. Thus, the curve 335 represents the situation when the length of the cable is 200 km and when the power consumption 126 of the load 127 is 80 MW. Further, the curve 337 represents the situation where the length of the cable is 600 km and the power consumption 126 of the load 127 is 80 MW. The transformers 105, 121 are 100 MVA transformers and the load impedance values are 90 kV and the power factor is 0.95. All transformer and motor voltages in the arrangement 100 is 90 kV.

Figure 4:
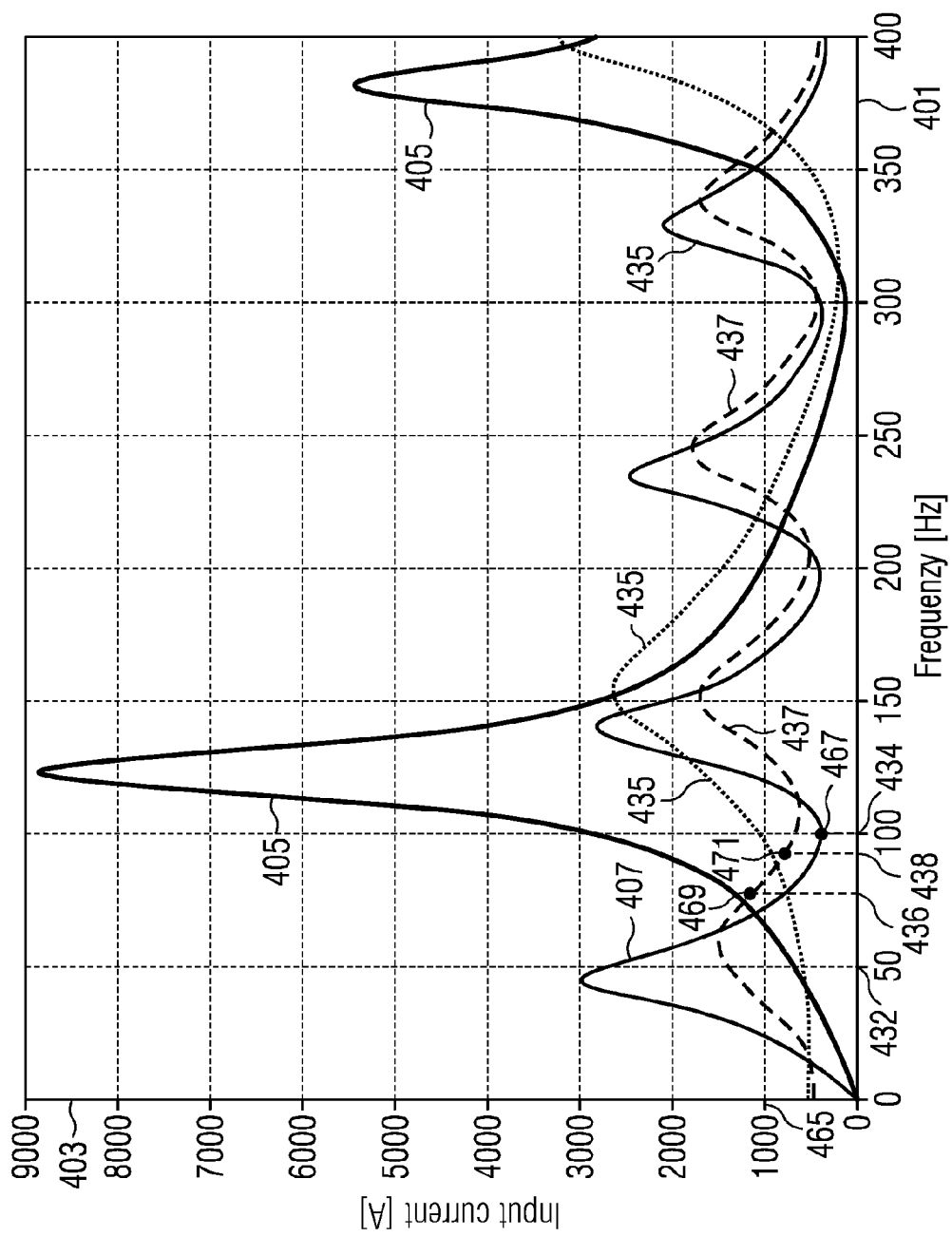
FIG. 4 illustrates a graph depicting an input current as a function of a frequency corresponding to the graph of FIG. 3 and illustrating a method for transferring electrical power according to an embodiment performed by the arrangement of FIG. 1 according to an embodiment.

FIG. 4 further illustrates the input current 104 (ordinate 403) as a function of the frequency (abscissa 401) for lengths l of the cable of 200 km and 600 km and the situation where no load or an 80 MW load is connected to the second end of the cable 101. Reference signs labelling input current curves in FIG. 4 differ only in the first digit from curves labelled in FIG. 3 for the corresponding voltage ratios. For example, the curves 405, 435 represent the input current of a 200 km long cable having no load and an 80 MW load, respectively, connected at the second end of the cable 111. Further, the curves 407, 437 correspond to the cable of length 600 km, when no load or an 80 MW load, respectively, is connected to the second end of the cable.

As can be taken from FIG. 3 and FIG. 4, for a 200 km long cable (200 km step out), 50 Hz (see abscissa 301 in FIGS. 3 and 401 in FIG. 4) may be taken as a possible working frequency. The frequency of 50 Hz is indicated by reference sign 332 or 432, respectively. Here, at 50 Hz, for the case of a 200 km long cable, the change of voltage ratio for the situations where no load and where an 80 MW load is connected to the cable is indicated by the value Δ (50 Hz, 200 km). However, for the case of a 600 km long cable, the respective change Δ (50 Hz, 600 km) is very big (e.g., bigger than the threshold Δr indicated in FIG. 3). As a result, a large voltage change occurs upon changing the load from no load to 80 MW. Thus, it is not possible to operate a 600 km cable at 50 Hz due to voltage amplification and high resonance currents (compare also the curves 407, 437 for the case of a 600 km long cable that indicate that the currents at 50 Hz are bigger than allowed according to a rating of the cable). A rating limit (exemplary at a current of 1000 A) is indicated with reference sign 465.

However, at the frequency 100 Hz (reference signs 334, 434), the change of the voltage ratio Δ (100 Hz, 600 km) from no load to an 80 MW load is reasonably small and also the currents of the curves 407, 437 at 100 Hz are below the rating limit 465 of the cable. The following electrical properties are obtained after simulating transferring AC power 103 with a frequency of 100 Hz through a cable 101 of a length l=600 km:

100 Hz and 600 km cable:
Uload/Uin no load: −1.095 dB=10^(−1.095/20)=0.8816
Uload/Uin load: −6.169 dB=10^(−6.169/20)=0.4915
Input current no load: 367.5 A
Input current load: 686.4 A The voltage difference is, for this frequency, 39.0% based on nominal values. At the same time, the current is close to within the nominal current of the cable of 510 A. The cable cross section may be increased to 400 mm$^2$ and then the cable current may typically be in the range of 700 A. Some iteration may be done to find an optimal cable and frequency.

If the subsea transformer is designed with a high secondary voltage to step the voltage up to typical 1.3 times the nominal subsea distribution voltage, the voltage drop during load may be limited and very much comparable to nominal load. To illustrate this, the case below may be a solution for a 600 km, 80 MW subsea grid.

In a 100 Hz case based on FIG. 3 and FIG. 4:
Topside Transformer:
Sn_tt=100 MVA
Un_sec=90 kV
Voltage reserves=1.35
Subsea Transformer:
Sn_ts=100 MVA
Un_pri=79.2 kV
Un_sec=36 kV
Voltage reserves=1.35
Subsea Distribution:
Un_distr=27.7 kV
Umax_distr=36 kV (during no-load)
Umin_distr=20.1 kV (during 80 MW load)
Cable Input Current:
Iin_min=367.5 A (during no-load)
Iin_max=686.4 A (during 80 MW load)

In a simulated 100 Hz case with optimized subsea transformer ratio:
Topside Transformer:
Sn_tt=100 MVA
Un_sec=90 kV
Voltage reserves=none
Subsea Transformer:
Sn_ts=100 MVA
Un_pri=85.5 kV
Un_sec=36.0 kV
Voltage reserves=none
Subsea Distribution:
Un_distr=27.7 kV
Umax_distr=35.9 kV (during no-load, corresponds to 1.3×Un_distr)
Umin_distr=23.4 kV (during 60 MW load, PF=0.97, corresponds to 0.85×Un_distr)
Cable Input Current:
Iin_min=365.4 A (during no-load)
Iin_max=895.8 A (during 60 MW load, PF=0.97)
Cable Maximum Voltage and Current:
Ic_max=1004 A (during no-load, lower during load)
Ic_max=91 kV (during no-load at topside, lower during load)

Given that a cable current of 1004 A may be handled in the cable in question, a 600 km step out case with 60 MW, PF=0.97 may be achieved. The voltage variations may be within the limits of a typical subsea system. The load may be increased above 60 MW, if the voltage is increased topside as a function of the system load.

To reduce the cable current during full load, e.g. to approximately 510 A, the topside voltage may dynamically be increased about 35%. The cable voltage rating may be 123 kV. There may be a risk that parts of the load are tripped during full load operation and that over voltages into the subsea transformer primary side and switchgear may occur. Normally one cable may be loaded with several loads, so the danger of tripping all loads at the same time may not be very realistic. If this should be a challenge anyway, the most likely voltage source may be converter topside supplying the 100 Hz voltage to the cable. This voltage source may be programmed to trip very fast (within milliseconds) based on events with sudden current changes. In addition, the subsea transformer may be designed in a way so the saturation of the subsea transformer core during a trip of loads may be saturated and used as an over voltage protection.

When the cable length increases, the damping bands may become more and more narrow, and a clean harmonic free source and load becomes more useful. To ensure a stable voltage, subsea regulating the voltage topside may be a useful approach, but also variation the frequency may be a solution that may be evaluated from project to project.

Figure 5:
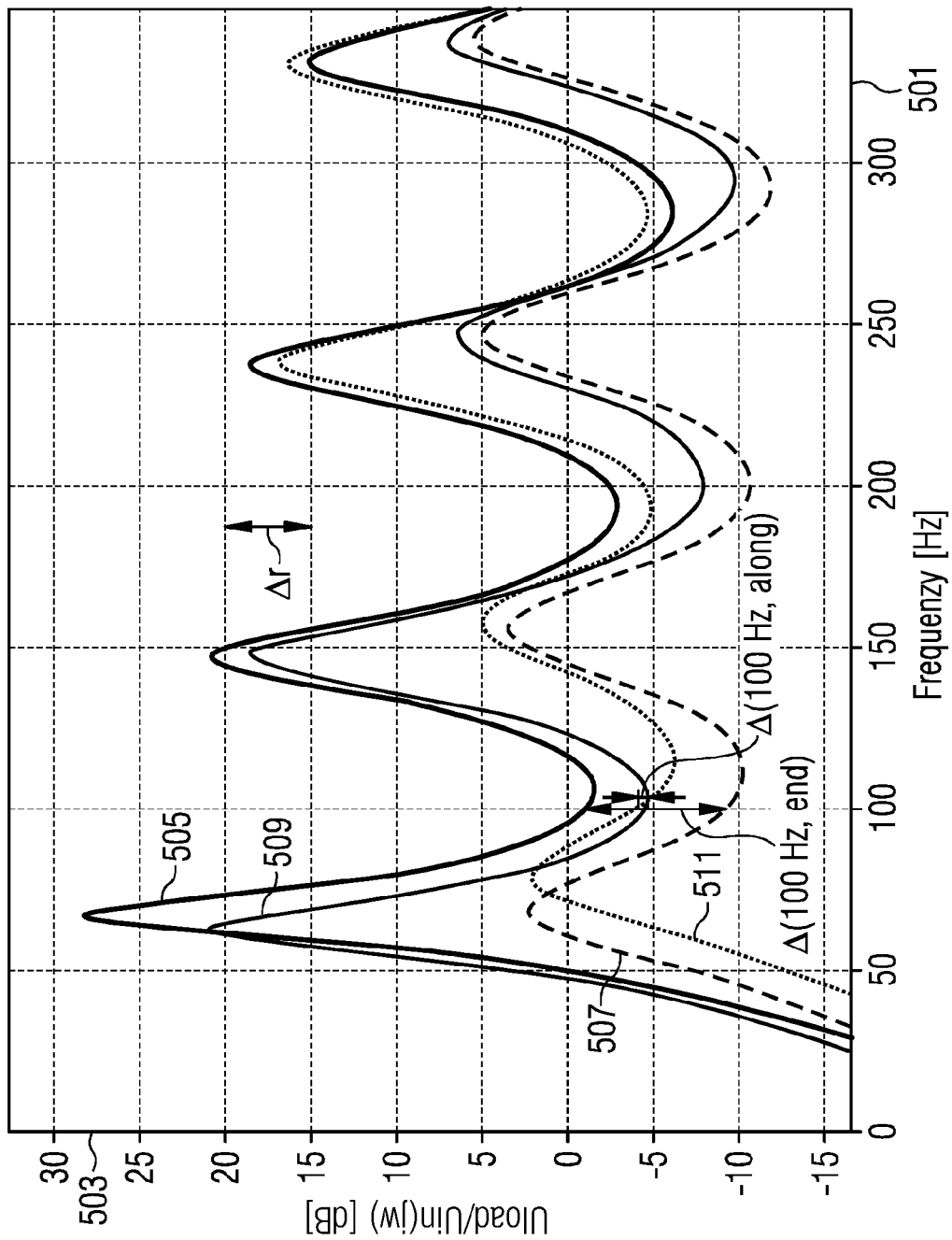
FIG. 5 illustrates a dependency of a voltage ratio as a function of the frequency to illustrate a method for transferring electrical power according to an embodiment when a capacity effect of a cable is compensated for using two or more reactors.
Figure 6:
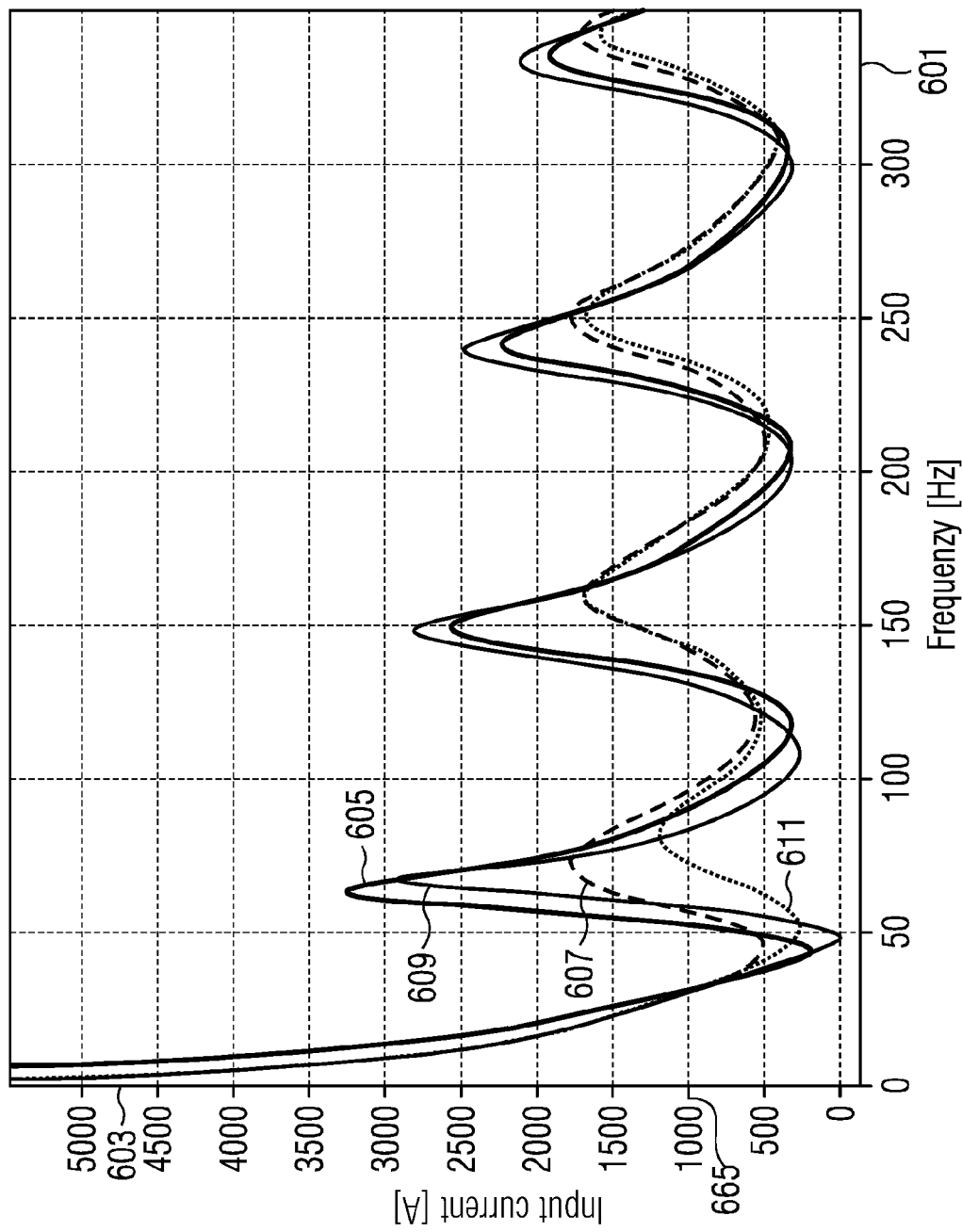
FIG. 6 illustrates a dependency of an input current as a function of the frequency to illustrate a method of transferring electrical power according to an embodiment when a capacity effect of a cable is compensated for using two or more reactors.

Another way of meeting the challenge of long step outs may be to compensate according to cable reactive power. If this is added based on 50 Hz, curves as shown in FIG. 5 and FIG. 6 may be calculated. The curves with end compensation have a reactor in each end of the cable. The total number of reactors is two. The case with along compensation have reactors along the cable equally distributed with the same reactive total value as for the end compensation, total number of rectors is 50. The compensation units may be a clean inductor or may be combined with a passive or active filter to further shape the resonance/damping frequencies.

According to an embodiment, the arrangement 100 may first be operated at a working point 367 (see FIG. 3 corresponding to working point 467 in FIG. 4), e.g., at 100 Hz for a 600 km long cable, in which substantially no load is connected to the second end 117 of the cable 111. Starting from the point 367, the power consumption 126 of the load 127 may be increased, e.g., up to a power consumption of 80 MW. Upon increasing the power consumption 126, the frequency of the AC power 103 may be decreased to reach an operation point 369, as is indicated in FIG. 3. The frequency is at a value, or is labelled with reference sign 336, that corresponds to about 70-75 Hz. Upon decreasing the frequency from 100 Hz to about 70-75 Hz, the change of the voltage ratio from the situation of no load to a situation of an 80 MW load is substantially 0. Thus, no voltage change or voltage drop may occur, when the frequency is changed from 100 Hz to about 70-75 Hz upon increasing the power consumption from 0-80 MW.

The different working points are also indicated in FIG. 4 with reference signs differing only in the first digit. As can be taken from FIG. 4, the working point 467 (100 Hz for a 600 km long cable, no load) corresponds to an input current well below the rating limit 465 (assumed to be 1000 A). However, the working point 469 (corresponding to the case of a 600 km long cable having an 80 MW load connected to the cable) corresponds to an input current above the rating 465. In this situation, either the rating of the cable, e.g., the cable properties, may be adapted or selected, or another working point 471 may be chosen such that the change in the voltage ratio is in an acceptable limit and additionally the input current is below the rating 465.

As can be taken from FIGS. 3 and 4, the working points 367, 369, 371 all lie between a first resonance peak 323 and a second resonance peak 325.

In FIG. 3, the frequency labelled with reference sign 334 may also be referred to as a previous frequency and the frequencies labelled with reference sign 336 or 338 may also be referred to as changed frequencies. Thus, according to an embodiment, when operating with a cable having a length of 600 km, and having no load connected to it, the AC power 103 may have a frequency of 100 Hz, thus corresponding to the working point 367 having the previous frequency 334. Upon increasing the power consumption of the load, the frequency may be changed from the previous frequency 334 to the changed frequency 336 or to the frequency 338. Because the power consumption has now changed from 0 MW to 80 MW, the working points 369 or 371 are reached, which lie on the curve 337. Although the working point 369 would be optimal regarding the change of the voltage ratio (indicated on the ordinate 303 of FIG. 3), at this frequency 336, the input current would be higher than the rating 465 (see FIG. 4). Because of that, as a potential working point, the point 371 to which the frequency 338 corresponds (indicated as frequency 438 in FIG. 4) may be selected. For this working point 371, the change of the voltage ratio is in an acceptable range and simultaneously the input current (see working point 471 in FIG. 4) is below the rating 465.

What is not indicated in FIGS. 3 and 4 is that the converter or in general the power supply 101 may also be adapted to change the first voltage $U_{in}$ as a function of power consumption of the load connected to the second end of the cable 111.

FIGS. 5 to 8 are graphs to illustrate when a compensation measure for compensating of the capacitor effect of the cable 111 is performed according to various embodiments. The compensation methods may be applied exclusively or in combination with the adjustments/selections of frequency that have been described with reference to FIGS. 2 to 4.

The abscissas 501, 601, 701, and 801 in FIGS. 5 to 8 denote the frequency. The ordinates 503, 703 denote the voltage ratio of the second voltage $U_{load}$ and the first voltage $U_{in}$. The ordinates 603, 803 denote the input current 104.

FIGS. 5 and 6 relate to the cable length l=600 km and illustrate the situations in which reactors are connected at the end points 113, 117 of the cable (curves 505 (no load) and 507 (80 MW load)) or in which plural reactors are connected along the cable (curve 509 (no load) and curve 511 (80 MW load)). The reactors are selected (see the reactors 115, 119 and 116 illustrated in FIG. 1) to compensate for 50 Hz. The curves 505, 507 thus have a reactor 115, 119 in each end of the cable 111. The total amount of reactors is thus two. In the case of reactors along the cable (curves 509, 511), the reactors 116 are equally distributed with the same reactive total value as for the end compensation. The total amount or the total number of reactors 116 is 50, in the illustrated example. Other numbers are possible. The compensation units (also referred to as reactors 115, 116, 119) may be clean inductors or may be combined with a passive or active filter to further shape the resonances/damping frequencies. For 100 Hz, the change of the voltage ratio Δ (100 Hz, along) with reactors distributed along the cable is smaller (e.g., smaller than the threshold Δr) than the voltage ratio Δ (100 Hz, end) with reactors connected at two ends of the cable.

When the size of the reactors 115, 116 and/or 119 is changed to 16.7 Hz, compensation and the other parameters are kept constant as for the 50 Hz case illustrated in FIGS. 5 and 6. The graphs illustrated in FIGS. 7 and 8 are obtained. The curves are labelled with reference signs differing only in the first digit compared to the reference signs used in FIGS. 5 and 6.

By appropriately adjusting the reactive total value of the reactors 115, 116 and 119, a change in the voltage ratio may be kept within acceptable limits and also the input current may be kept below a rating limit of the cable 111.

According to the present disclosure, three main approaches are described, in order to provide a method and an arrangement for transferring electrical power in the sea. The first approach uses the resonance effect active in the cable, to stabilize the voltage at subsea, e.g., by selecting/adjusting the frequency depending on the cable length. A second approach performs a reactive compensation of a subsea supply cable along the length or at end points of the cable, to limit out the capacitive effect of the cable. A third approach uses for example a topside converter, to generate a requisite frequency and may apply or employ the converter, to vary (e.g., slowly) the topside frequency and/or voltage as a function of a power consumption of the load connected at the subsea location. Further, in case of a trip of the load, the topside source may react very fast by tripping or to actively regulate down the voltage and damp out transients.

According to various embodiments, these three approaches may be performed separately or in any combination. The first approach, the second approach and the third approach may each be performed separately without performing the respective other approaches. Alternatively, two of the approaches, e.g., the first and the second, the first and the third, or the second and the third, approach may be performed in combination. Still further, all approaches, the first, the second and the third approach may be performed in combination.

According to the first approach, the cable capacitor effect may be utilized, to stabilize the subsea voltage from a situation in which no load is connected to a situation in which a load with a high power consumption is connected to the end of the cable located at the subsea location. This may be performed for example by looking or using frequencies higher than the lowest resonance frequency of the cable. This may be an alternative for the extreme long step-outs in which the first cable resonance conflicts with the fundamental 50 Hz in a standard AC system.

The second approach may apply to compensate for the reactive power generated in the cable, along the cable or at the ends of the cable. If this is done, the voltage drop from no-load to a high power consumption load may be given by the serial impedance. This second approach may be a good solution for shorter step-outs such as step-outs (e.g., cable lengths) between 100 km and 300 km.

Power consumption of the load may be in the range of 50-100 MW. Further transient conditions may be taken into account. A topside converter may thus be configured to damp out transients in the cable system.

A working frequency may be set such that core losses, skin/proxy-effect are in reasonable limits.

It should be noted that the term "comprising" does not exclude other elements or steps and "a" or "an" does not exclude a plurality. Also, elements described in association with different embodiments may be combined.

It is to be understood that the elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent, and that such new combinations are to be understood as forming a part of the present specification.

While the present invention has been described above by reference to various embodiments, it should be understood that many changes and modifications may be made to the described embodiments. It is therefore intended that the foregoing description be regarded as illustrative rather than limiting, and that it be understood that all equivalents and/or combinations of embodiments are intended to be included in this description.

The invention claimed is:

1. A method for transferring electrical power in the sea, the method comprising:
   generating AC power;
   guiding, at least partially underwater, the AC power through a cable from a first end of the cable to a second end of the cable; and
   changing a frequency of the AC power guided through the cable based on a value of power consumption of a load connected to the second end of the cable, the changing comprising changing the frequency from a previous frequency at a previous value of power consumption to a changed frequency at a changed value of power consumption, wherein the previous frequency is selected based on a length of the cable between the first end of the cable and the second end of the cable,
   wherein the changed frequency is based on calculating a plurality of voltage ratios between a first voltage and a second voltage based on different test frequencies and based on at least the previous value of power consumption and the changed value of power consumption, and
   wherein the first voltage represents a voltage of the generated AC power or a voltage at the first end of the cable, and the second voltage represents or is indicative of a potential difference between the second end of the cable and a reference potential.

2. The method of claim 1, wherein the frequency of the AC power is changed by a topside converter located above the sea level, and wherein the load is a subsea load located below the sea level.

3. The method of claim 1, wherein the previous value is smaller than the changed value, and wherein the previous frequency is greater than the changed frequency.

4. The method of claim 1, further comprising:
   changing the first voltage based on the power consumption of the load connected to the second end of the cable.

5. The method of claim 4, wherein the first voltage is changed from a previous first voltage at the previous value of power consumption to a changed first voltage at the changed value of power consumption, wherein the previous first voltage is smaller than the changed first voltage.

6. The method of claim 4, wherein changing the frequency comprises:
   selecting the previous frequency and the changed frequency such that the respective calculated voltage ratio changes, from a situation of the previous value of power consumption to the changed value of power consumption, less than a ratio threshold.

7. The method of claim 6, wherein an absolute value of the ratio threshold is 0.5.

8. The method of claim 6, further comprising:
   calculating a plurality of input currents for a plurality of test frequencies, the input current representing a respective current of the generated AC power supplied to the first end of the cable,
   for each test frequency, considering at least the previous value of power consumption of the load, wherein the previous frequency, the changed frequency, or the previous frequency and the changed frequency, are selected from the plurality of test frequencies for which the input current is within a range according to a rating of the cable.

9. The method of claim 6, wherein an absolute value of the ratio threshold is 0.4.

10. The method of claim 6, wherein an absolute value of the ratio threshold is 0.3.

11. The method of claim 6, wherein an absolute value of the ratio threshold is 0.2.

12. The method of claim 4, further comprising,
   in case of a trip of a load connected to the second end of the cable, regulating down the first voltage to damp out transients.

13. The method of claim 4, wherein the previous first voltage is predetermined and the second voltage is calculated for a given power consumption of the load based on a model of the cable, the model including a plurality of PI elements, wherein the second end of the cable is between 1000 m and 4000 m below sea level, wherein the cable has a length between 100 km and 1000 km, and wherein the voltage at the cable is between 80 kV and 100 kV.

14. The method of claim 4, wherein changing the first voltage comprises:
   selecting the previous first voltage and the changed first voltage such that the respective calculated voltage ratio changes, from a situation of the previous value to the changed value of power consumption, less than a ratio threshold.

15. The method of claim 14, further comprising:
   calculating a plurality of input currents for a plurality of test frequencies, the input current representing a respective current of the generated AC power supplied to the first end of the cable, for each test frequency, considering at least the previous value of power consumption of the load, wherein the previous frequency, the changed frequency, or the previous frequency and the changed frequency, are selected from the plurality of test frequencies for which the input current is within a range according to a rating of the cable.

16. The method of claim 1, further comprising:
transforming a voltage of the AC power to a higher voltage and supplying the transformed voltage to the first end of the cable; and
transforming the AC power guided through the cable at the second end of the cable and supplying the transformed AC power to a load.

17. The method of claim 1, wherein the previous frequency of the AC power is between 10 Hz and 300 Hz.

18. The method of claim 1, further comprising:
transforming a voltage of the AC power to a higher voltage and supplying the transformed voltage to the first end of the cable.

19. The method of claim 1, further comprising:
transforming the AC power guided through the cable at the second end of the cable and supplying the transformed AC power to a load.

20. The method of claim 1, wherein the previous frequency of the AC power is between 50 Hz and 150 Hz, and wherein between 80% and 100% of the length of the cable is disposed underwater.

21. A method for transferring electrical power in the sea, the method comprising:
generating AC power;
guiding, at least partially underwater, the AC power through a cable from a first end of the cable to a second end of the cable; and
changing a frequency of the AC power guided through the cable based on a value of power consumption of a load connected to the second end of the cable, the changing comprising changing the frequency from a previous frequency at a previous value of power consumption to a changed frequency at a changed value of power consumption, wherein the previous frequency is selected based on a length of the cable between the first end of the cable and the second end of the cable,
wherein a frequency between resonance peaks according to a calculated voltage ratio curve is selected as the previous frequency.

22. An arrangement for transferring electrical power in the sea, the arrangement comprising:
a power supply for generating AC power;
a cable for guiding, at least partially underwater, the AC power through the cable from a first end of the cable to a second end of the cable; and
a converter for changing a frequency of the AC power guided through the cable based on a value of power consumption of a load connected to the second end of the cable, the converter being configured to change the frequency from a previous frequency at a previous value of power consumption to a changed frequency at a changed value of power consumption, wherein the previous frequency is selected based on a length of the cable between the first end of the cable and the second end of the cable,
wherein the changed frequency is based on calculating a plurality of voltage ratios between a first voltage and a second voltage based on different test frequencies and based on at least the previous value of power consumption and the changed value of power consumption, and
wherein the first voltage represents a voltage of the generated AC power or a voltage at the first end of the cable, and the second voltage represents or is indicative of a potential difference between the second end of the cable and a reference potential.

* * * * *